Dec. 16, 1958  W. H. HORTON  2,864,190
SLIDE CHANGER FOR PROJECTORS
Filed Sept. 4, 1956  2 Sheets-Sheet 1

WILLIAM H. HORTON
INVENTOR.

BY

ATTORNEYS

Dec. 16, 1958  W. H. HORTON  2,864,190
SLIDE CHANGER FOR PROJECTORS
Filed Sept. 4, 1956  2 Sheets-Sheet 2
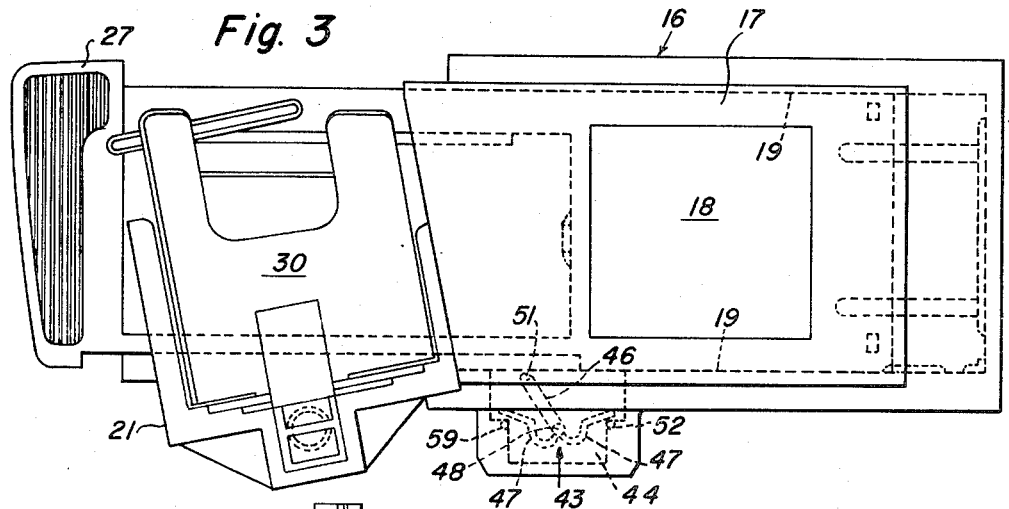
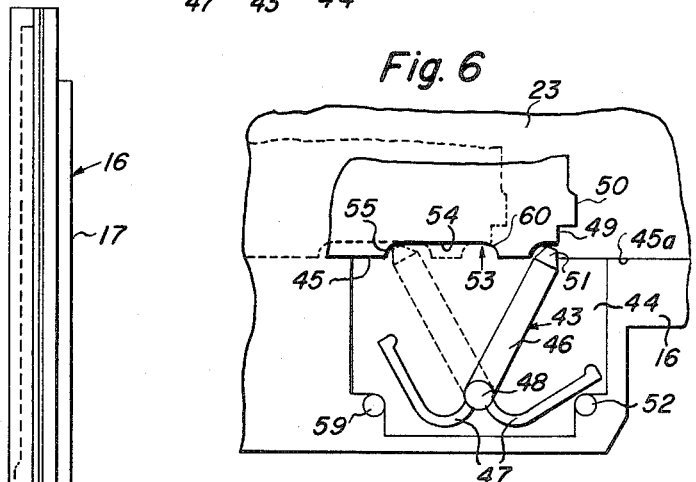
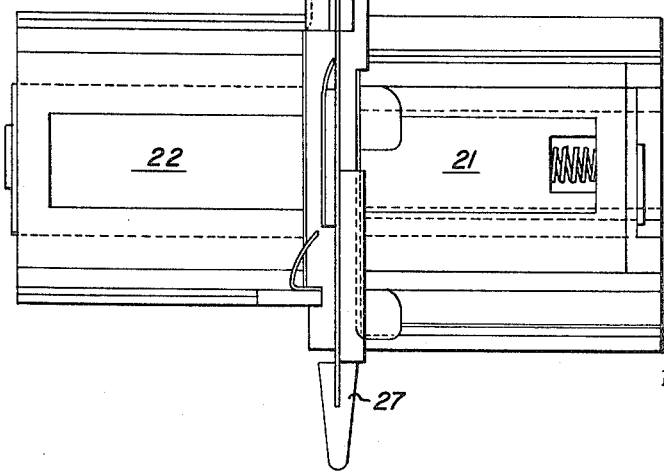
WILLIAM H. HORTON
INVENTOR.
BY
ATTORNEYS United States Patent Office 2,864,190
Patented Dec. 16, 1958

2,864,190

SLIDE CHANGER FOR PROJECTORS

William H. Horton, Rochester, N. Y., assignor to Eastman Kodak Company, Rochester, N. Y., a corporation of New Jersey Application September 4, 1956, Serial No. 607,613

7 Claims. (Cl. 40—79)

The present invention relates broadly to slide changers, and more particularly to a slide projector in which transparencies or slides are moved to and from projecting position.

Many types of slide changing devices are formed with a plate provided with a projection aperture adapted to be arranged in alignment with the optical axis of the projector. The plate has attached thereto supply and take-up magazines which are positioned on opposite faces of the plate. These magazines may be arranged at opposite ends of or at the same end of the plate. Followers of one type or another are positioned in the magazines to maintain the slides therein in a stacked relation. A slide changer or plate is reciprocally mounted on the apertured plate and is adapted to move slides from the supply magazine onto and along tracks or guideways on the plate in registering relation with the projection aperture. After the slide is projected, it is moved from registry with the aperture and into the take-up magazine. The direction of movement of the slide changer to move the projected slide into the take-up magazine, depends upon whether the take-up magazine is at the opposite end or at the same end as the supply magazine. Suitable springs may be provided on the aperture plate to move and retain the positioned slide in proper registering relation with the projection aperture. Also, suitable members may be provided on the changer to move the slides from projecting position to the take-up magazine. The structure so far described may be of standard and well known construction and forms no part of the present invention.

It has been found that when the slide changer is moved to shift the front or foremost slide in the slide magazine laterally out of the magazine and onto the aperture plate, such shifting may be impeded by reason of interference between the edges of the aperture of the slide being moved and the edges of the aperture of the adjacent slide in the supply magazine, all of which is well known to those familiar with slide projectors. In order to eliminate, or at least greatly reduce, the possibility of such edge interference, the present invention tilts the supply magazine about an axis normal to the slide changer and in a direction away from the projection aperture so that the slides in the supply magazine are arranged at an angle to the track or guideway of the apertured plate, and with the top edge of the slide tipped away from the projection aperture, see Fig. 5. Then, when the slide changer is moved forward to shift the front slide out of the supply magazine, the slide changer and a part of the plate track or guideway cooperate to rock or rotate the front slide through an angle toward the projection aperture to move the ejected slide into alignment with the track or guideway of the apertured plate. This rotation or rocking of the slide will cause the edges of the aperture of the adjacent slides to pass obliquely rather than in parallel relation, as in prior structures, thus reducing materially any tendency toward such edge interference so as to permit free movement of the front or foremost slide out of the supply magazine upon movement of the slide changer.

The present invention has as its principal object, the provision of an arrangement by which the interference between a slide being moved or ejected from the supply magazine and an adjacent slide of such magazine is materially reduced or eliminated.

Still another object of the invention is the provision of such a mechanism which is simple, inexpensive, rugged, easy to operate and highly effective in use.

To these and other ends the invention resides in certain improvements and combinations of parts all as will be hereinafter more fully described, the novel features being pointed out in the claims at the end of the specification.

The invention accomplishes the above objects in a slide changing device of the type wherein slides are fed from a stack one at a time by edgewise translational movement along a guideway from a supply position toward a display position, by rocking each slide in its own plane as it moves from the supply position, thereby to greatly reduce the possibility of interference of the slide with an adjacent slide, which is likely to result in jamming.

In the drawings:

Fig. 2 is a plan view of one form of slide changer with which the structure of the present invention may be used;

Fig. 3 is a side elevation end view of the mechanism illustrated in Fig. 2, and as seen from the right thereof showing the angular relation of the supply magazine.

Fig. 6 is a partial side elevation view of the structure illustrated in Fig. 3, with the side plate removed, showing the interlock for the slide changer.

Similar reference numerals throughout the various views indicate the same parts.

Figure 1:
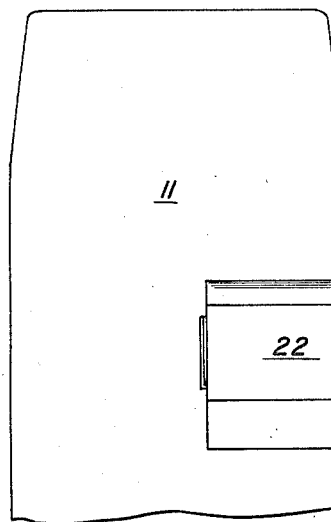
Fig. 1 is a side elevation of a portion of a slide projector showing the relation thereto of a slide changing mechanism constructed in accordance with the preferred embodiment of the invention.

In Fig. 1, the slide changer device of the present invention is shown in place on one form of a slide projector which is provided with a lamp house 11 and a slide gate 12 adapted to receive the slide changer device of the present invention, and a projection lens tube 13. This particular form of projector is shown for illustrative purposes only and is not intended as a limitation, as the structure of the present invention is adapted for use in a wide variety of slide projector designs.

The slide changer device of the present invention comprises an elongated body portion 16 on which is mounted a plate 17 having formed adjacent one end thereof a projection aperture 18. The top and bottom of the body portion are formed with vertically aligned tracks or guides 19 along which the slides 20 are moved individually from a supply magazine 21, positioned at one end of the body portion, and into registry with the aperture 18 for projection of the image area of the slide, as is deemed apparent from the drawings. The entrance to the guideways 19 forms a shoulder 19a which serves as abutment means to cooperate with each slide as it moves into the guideways, to cause rocking of the slide in its own plane from the solid line position of Fig. 5 to the dotted line position of that figure.

As is well known, the aperture 18 is positioned in alignment with the light source and the optical members of the projector. After the slides have been projected, they are moved into the take-up magazine 22 which is positioned on the opposite face of the body portion and may be arranged at the opposite end or at the same end as the supply magazine; the latter arrangement being shown in the drawings. But, here again, this is for illustrative purposes only as the invention may be used with the type of slide changer such, for example, as shown in Estes Patent 2,533,441, in which the supply and take-up magazines are at opposite ends of the device.

A flat slide changer, member or plate 23 is mounted for reciprocating sliding motion in the guideways 19 to feed the front or foremost slide 20 in the supply magazine 21 onto the tracks 19 and into registry with projection aperture 18. In order thus to move the front slide, the plate 23 has formed thereon or secured thereto, an auxiliary plate 24 which is provided with a straight edge or shoulder 25 which is positioned on its leading edge and is movable into engagement with the trailing edge 26 of the first slide 20 in the supply magazine 21 to move this first slide out of the magazine and onto the track 19, all of which is deemed apparent to those skilled in the art. The outer end of the plate 23 is formed with a handle or operating member 27. The slide changer plate 23 is also provided with an inclined lug 28 which is adapted to engage the top edge 29 of each slides as the slides are moved along the magazine 21 toward changer 23 to cam or move the slides individually downwardly and into correct position to be moved by the changer 23. The slides in both the supply magazine 21 and the take-up magazine 22 are held in erect position by means of spring-pressed followers 30, only one of which is shown in Fig. 3. The follower in the supply magazine serves to feed the slides toward the slide changer 23, as is well known.

The arrangement is such that when the slide changer plate 23 is moved to the upward, as viewed in Fig. 2, the front slide in the supply magazine 21 is moved out of the supply magazine and onto and along the guideway 19 into registering relation with the projection aperture 18 by means of shoulder 25 of plate 24, which engages the trailing edge 26 of said first slide. Suitable springs, not shown, may be provided to retain the positioned slide in proper relation for projection. Springs, clips or fingers, not shown, on plate 23 serve to move the projected slide back into the take-up magazine 22 on the return or rightward movement of the changer plate 23.

As the front slide is moved out of the supply magazine, this slide may catch on the next slide in the magazine, as is well known. To reduce such interference, a cam 31 is carried by plate 23, as the latter is moved to bring edge 25 into engagement with edge 26 of the front slide so the cam 31 will engage the second slide in the magazine to move or tilt the latter, and the other slides, rearward to free the front slide so the latter may be moved easily out of the magazine. The slide changer parts so far described may be of any standard and well known construction, and do not form, per se, a part of the present invention. It has been found, however, that with such prior structures, the front slide while being moved out of the supply magazine is moved parallel to the adjacent slide in the magazine. Such parallel movement, even with the arrangements above described, often causes the edges of the aperture of the slide being moved to catch on and interfere with the edges of the aperture of the adjacent or second slide in the magazine. Such interference is much more pronounced if the slides are bent or buckled so as not to lie in a plane.

To reduce this interference tendency between the slides, the present invention provides an arrangement by which the ejected or moving slide moves obliquely over the adjacent slide rather than parallel thereto, as in prior devices. This oblique movement has been found greatly to reduce the catching or engaging of the slide aperture edges and to allow free movement of the slide from the supply magazine.

Figure 5:
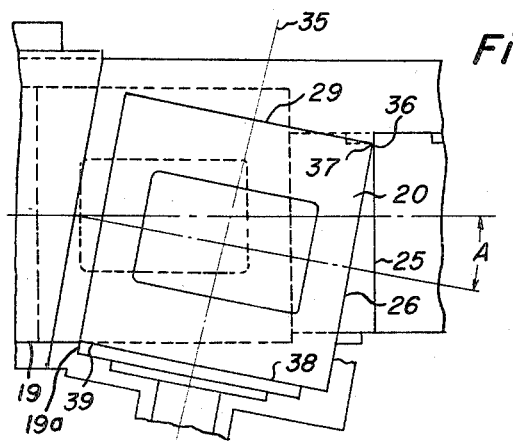
Fig. 5 is a side elevation view of the supply magazine, with the pressure pad removed, showing the angled relation of the slides in the supply magazine to the apertured plate and the slide changer plate.

To secure this result, the supply magazine is not arranged vertically, as in prior structures; but, on the contrary, has the vertical axis 35 inclined clockwise and away from the projection aperture 18, or to the right as viewed in Fig. 5. With this arrangement, the slides 20 in the supply magazine are also tilted or angularly arranged as shown in Fig. 5. Now, when the slide changer plate 23 is moved inwardly, or to the left, as viewed in Fig. 5, the edge or shoulder 25 of the plate 24 does not engages along its full length the trailing edge 26 of the slide, as is apparent from an inspection of Fig. 5. On the contrary, the shoulder 25 engages only at a point 36, or at least only over a small area with the edge 26 of the slide 20 adjacent the upper right corner 37, as illustrated in Fig. 5. The lower edge 38 of the slide 20 lies below and is tilted downward to the right relative to the tracks or guideway 19, as best shown in Fig. 5. The lower left corner 39 of the front slide in the magazine rests on the guideway 19, as best shown in Fig. 5.

Now, the inward movement of the plate 23 will cause the part 36 of shoulder 25 to engage the upper right corner 37 of the front slide 20. Further leftward movement of plate 23 and shoulder 25 will cause the slide to rock about its lower left corner 39 in its own plane about shoulder 19a until the slide has been moved to the dotted position shown in Fig. 5 and in alignment with the guideway 19. In this position, the full edge of shoulder 25 is in full engagement with the edge 26 of the slide. As the plate 23 is moved further to upward, Fig. 2, the shoulder 25 acting on edge 26 moves the slide along the guideways or track 19 and into projection position in register with the projection aperture 18. Thus, the structure of the present invention serves to rotate or rock the slide 20 in its own plane through an angle A, Fig. 5, as the slide is moved out of the supply magazine and onto the tracks or guideways. This rotation serves to cause the ejected or moved slide to pass obliquely over the adjacent or second slide in the magazine and this oblique movement materially reduces the chances of the aperture edges of the adjacent slide catching, and allows freer movement of the front slide out of the magazine, the advantages of which are deemed apparent.

It has been found that with prior structures, the operator may start the movement of the slide changer plate 23 and actually move a slide out of the magazine and onto the track or guideway, and may then inadvertently return the plate 23 to its initial or starting position, leaving the slide in partly positioned relation on the tracks 19 and out of registry with the aperture 18. Now, if the operator should again actuate the plate 23, a second slide will be moved or ejected from the supply magazine onto the track or guideways and will interfere or jam with the previously ejected slide, which is already on the tracks or guideways, the disadvantages of which are deemed apparent.

In order to eliminate such a possibility, the present invention provides an interlock arrangement for the slide changer plate 23 which will prevent return of the plate to its initial position until the starting movement has been completed and the plate reaches the end of its travel.

To secure this result, the present invention provides an interlock or ratchet which is positioned just below the slide changer plate 23, and is adapted to cooperate with the latter to prevent reverse movement thereof until the plate has completed its movement. To this end a T-shaped ratchet, generally indicated by the numeral 43, is mounted in recess 44 on the body portion 16, just below the lower edge 45 of the changer plate 23, as clearly illustrated in Fig. 6. The recess 44 may be covered or closed by a suitable cover plate, not shown. This ratchet has a straight base portion 46 which extends upward, see Fig. 6, from a pair of bowed laterally extending arms 47. The ratchet 43 is pivoted at 48 on the adjacent body portion. The arrangement is such that the portion 43 will swing or rock about pivot 48 to one of the two positions illustrated in Fig. 6. In its free position, the ratchet will be positioned with portion 46 extending vertically upward so that the portion 46 will then be in what may be termed its "dead center" position.

As the slide changer plate 23 is moved inwardly to move or eject a slide from the magazine 20, a shoulder 49 adjacent the leading edge 50 and just above the bottom edge 45a of plate 23, see Fig. 6, will engage the free end or tip 51 of the base portion 46 to rock the ratchet 43 clockwise about pivot 48 to the position indicated in the solid lines, Fig. 6. As the rightward movement of the plate 23 continues, the lower edge 45 of the plate 23 will engage the tip 51 to rock the portion 46 slightly further clockwise. Such further rocking will bring the right arm 47, Fig. 6, into engagement with a fixed stop or lug 52 positioned in the recess 44, and as the arms 47 are flexible, the arm will be bent or tensioned. This tensioning of arm 47 serves to hold the tip 51 yieldably in engagement with the lower edge 45 of plate 23. The tip 51 rides along the lower edge 45 of plate 23 until a shallow notch 53 formed on edge 45 is moved into registry with the tip 51. Such registration occurs after the plate 23 has been moved only a slight distance and long before the slide has been moved into registry with the aperture 18. When the notch 53 is moved into registry with the tip 51 the portion 46 will rock slightly counterclockwise about the pivot 48 under the action of the tensioned right arm 47 to bring the tip 51 into engagement with the bottom 54 of notch 53. This bottom 54 is spaced from the pivot 48 a distance less than the length of the portion 46 so the latter cannot move to its vertical or "dead center" position.

With the tip 51 engaging the bottom 54 of notch 53, any leftward movement of the plate 43 will cause the tip to wedge against the bottom 54 to prevent effectively such leftward movement. Thus, once the rightward movement has been started so as to feed a slide out of the supply magazine 21, and the position has been reached where the tip 51 engages the notch 53, which occurs only a short time after the slide has been ejected, the plate 23 cannot be moved to the left or to its starting position so as to leave a partly moved slide on the tracks. However, as the rightward or feeding movement of the plate is continued, the tip 51 slides along the bottom 54 of the notch 53 until the left edge 55 of the notch 53 finally engages tip 51 to rock the portion 46 slightly clockwise. As the rightward movement of the plate 23 continues, the tip 51 rides along the lower edge 45 of plate 43, being held yieldably thereagainst by the tensioned right arm 47, the edge 45 engaging tip 51 to prevent return movement of plate 23. However, when the plate 23 has completed its right movement and the slide 20 has been moved into registry with the projection aperture 18, a second notch 56 formed on the lower edge 45 of plate 23 is moved into registry with the tip 51. The notch 56 is deeper than the notch 53 and the bottom 57 of the notch 56 is spaced from the pivot 48 a distance greater than the length of the base portion 46. The latter is now unrestrained and will rock counterclockwise about its pivot 48 under the action of the tensioned arm 47 until the portion 46 is moved to a vertical or "dead center" position. Thus, the plate 23 is not freed for the return or leftward movement until its forward or rightward movement has been completed.

After the slide has been moved by the shoulder 25 into projecting position, the changer plate 23 is moved to the left, Fig. 6, or to the downward as viewed in Fig. 2, to return the plate to its initial position and ready to move the next slide out of the supply magazine. This return movement of plate 23 is utilized to move a previously projected slide out of registering relation with the projection aperture 18, and returns the projected slide to the take-up magazine. This return movement of the slide may be accomplished by suitable means, not shown, carried by the slide changer plate 23. Once the return movement of plate 23 is started, it is important that this movement be completed before the plate 23 can be moved to the right so as to prevent the projected slide being left on the track between the aperture 18 and the take-up magazine 22. For this reason, it is also desirable to lock the plate 23 against rightward movement after the leftward or return movement has been started.

Figure 4:
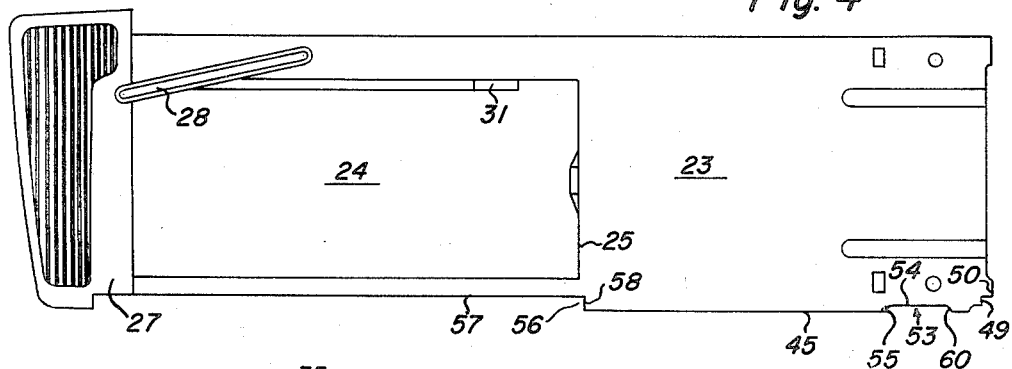
Fig. 4 is a side elevation view of the slide changer plate detached from the device illustrated in Figs. 1 and 2.

The above-described ratchet 43 is adapted to prevent this second locking operation. It will be remembered that when the plate 23 has completed its forward or feeding movement, the portion 43 of the ratchet is in registry with the deeper notch 56 and the base portion 46 is in its "dead center" or vertical position. Now, as the plate 23 starts the return movement to the left, as viewed in Figs. 4 and 6, the right edge 58 of notch 56 finally moves into engagement with the tip 51 of portion 46 and rocks the latter counterclockwise about pivot 48. Thus, the edge 58 rocks portion 46 counterclockwise to the position shown in the dotted lines in Fig. 6. The tip 51 then rides along the bottom edge 45 of plate 23 and the left arm 47 is moved into contact with a fixed pin or stud 59 positioned in recess 44. Such engagement with the pin serves to bend or flex the left arm 47 to tension the latter to hold the tip 51 yieldably against the lower edge 45 of plate 23, the portion 46 being inclined to the left as shown in the dotted lines, Fig. 6. The tip 51 continues to ride along the edge 45 and is held thereagainst by the tensioned left arm 47. When the notch 53 finally moves into registry with tip 51 the latter drops thereinto, but the tip 51 will engage bottom 54 to lock plate 23 against rightward movement. During this time, any attempt to move the plate 23 in the opposite or rightward direction, Fig. 6, will cause the tip 51 to engage and wedge against the edge 45 of plate 23 and prevent such rightward movement. However, as the leftward or return movement continues, the right edge 60 of notch 53 engages the tip 51 to rock portion 56 about its pivot and the tip 51 then rides along the balance of the lower edge 45 of plate 23. Finally, when the plate 23 has completed its rightward or return movement to move the slide into the take-up magazine 20, the right or leading edge 50 of the plate 23 is again moved into registry with the tip 51 and the portion 46 is no longer held by the edge 45 and the portion 46 rocks clockwise under the action of the tensioned left arm 47 to return the portion 46 to its vertical or "dead center" position for the starting of another cycle.

Thus, the ratchet 43 provides a stop or interlock which will prevent effectively the movement of the slide changer plate in the opposite direction once the movement of the plate has been started in one direction. The plate can be moved in the opposite direction only after the movement in said one direction has been completed. This interlock arrangement is effective both on the slide feeding as well as the slide returning movement of the plate 23, the advantages of which are deemed apparent. This ratchet is simple, effective and automatic in its operation.

The present invention thus provides a new and improved slide changer which greatly facilitates the free and unobstructed movement of a slide out of the supply magazine and onto the guideway or tracks which directs or guides the slides successively and individually into registering relation with the projection aperture. Also, an effective interlock is provided which will prevent return of the slide changing plate to its initial or starting point until the plate stroke has been completed, so as to prevent jamming of slides on the guideway or track. While the structures of above-described invention have been described and illustrated in connection with a slide projector, it is apparent and is intended that such devices are also adapted for use with slide viewers in which the slides are movable by a reciprocating slide changer.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What I claim and desire to secure by Letters Patent of the United States is:

1. In a slide changer of the type wherein a stack of slides is fed by edgewise translational movement of one slide at a time in a predetermined feed orientation along a supporting surface from a supply position toward a display position, the combination comprising a holder for slides in said supply position, said holder being disposed so that a first slide located therein in a position to be fed next toward the display position is disposed in a supply orientation with its respective edges in non-parallel relation with the orientation of the same edges during said edgewise translational movement, and slide moving means movable in the direction of said display position, and, in the course of said movement, being engageable with a trailing edge portion of said first slide for moving the slide onto said supporting surface and thereby causing angular movement of the slide in its own plane from said supply orientation into said feed orientation.

2. A slide changer of the type in which slides are moved edgewise one at a time along a guideway from a supply position toward a display position, comprising, a holder for a plurality of slides in said supply position, reciprocating means engageable with an edge of each slide for moving the slides successively from said supply position along said guideway toward the display position, and a shoulder located in the path of movement of slides toward said display position and engageable by another edge of each slide upon initial movement of the slide toward said display position to rock the slide in its own plane, thereby facilitating movement of the slide from the supply position.

3. A slide changer of the type in claim 2 wherein said shoulder is located at the entrance to the guideway and is formed in a slide supporting surface thereof.

4. A slide changer comprising, in combination, an apertured plate definining a slide viewing position, a slide moving element reciprocable relative to said plate for moving a slide into registraiton with said aperture, a slide supply magazine positioned to feed slides to said reciprocable element and angularly positioned relative to the path of movement of said element, and means on said element engageable with a selected slide in said magazine to rock the slide in its own plane as the slide is moved out of the magazine by said element toward said apertured plate.

5. A slide changing device comprising, in combination, wall means defining a guideway and having an aperture located at a slide viewing position, a slide supply magazine positioned at an end of said guideway spaced from said aperture, a slide moving element reciprocable relative to said wall means and engageable with a slide in the magazine for moving the slide out of said magazine into said guideway, said magazine being tilted about an axis normal to said slide moving element, and abutment means located in the path of movement of slides from the magazine into the guideway for engaging slides in the course of such movement to rock the slides about said axis and in the direction of the slide feeding movement of said element.

6. A slide changing device as set forth in claim 5, wherein said abutment means comprises a shoulder formed in a slide supporting surface of said guideway.

7. A slide changing device as set forth in claim 5, wherein the tilting of said magazine is such that the slides rock through an angle of less than 90°.

References Cited in the file of this patent
UNITED STATES PATENTS

| | | |
|---|---|---|
| 952,199 | James | Mar. 15, 1910 |
| 1,002,078 | Paoli | Aug. 29, 1911 |
| 1,108,935 | Schwanhausser | Sept. 1, 1914 |
| 1,159,681 | Kastner | Nov. 9, 1915 |
| 2,104,094 | Nerwin | Jan. 4, 1938 |
| 2,260,660 | Darwin | Oct. 28, 1941 |
| 2,532,775 | Leonard | Dec. 5, 1950 |
| 2,533,441 | Estes | Dec. 12, 1950 |
| 2,583,442 | Parlini et al. | Jan. 22, 1952 |
| 2,634,653 | Barth | Apr. 14, 1953 |
| 2,705,437 | Lessman | Apr. 5, 1955 |

FOREIGN PATENTS

| | | |
|---|---|---|
| 567,557 | France | Aug. 22, 1924 |
| 441,727 | Germany | Mar. 8, 1927 |